Patented Dec. 5, 1939

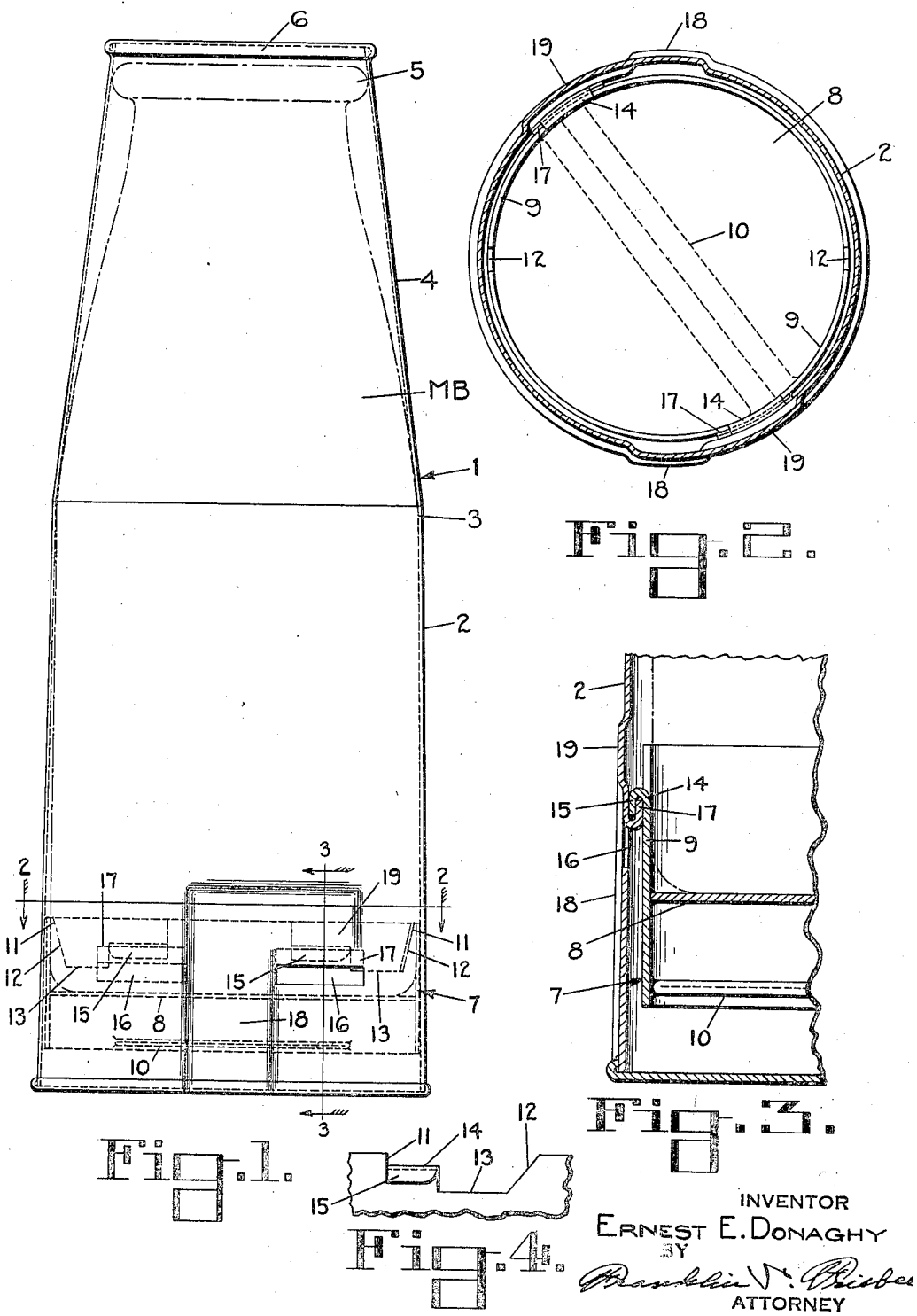

2,182,017

UNITED STATES PATENT OFFICE 2,182,017

MILK BOTTLE CARRIER

Ernest E. Donaghy, St. Johnsbury, Vt.

Application June 1, 1937, Serial No. 145,689

7 Claims. (Cl. 220—40)

This invention relates to improvements in milk bottle carriers and more particularly to carriers adapted to permit the transportation of milk bottles safely and in a sanitary manner.

An important object of the invention is to provide a carrier that is readily portable and provided with means for entirely enclosing a milk bottle and thereby protecting the bottle itself from all personal handling and any contact with contaminating or germ conveying substances.

Another object is to provide a carrier having detachable means for holding a milk bottle securely therein, which may be readily released in order to permit the removal of the bottle.

Another object is to provide a carrier having two sections, each section being provided with adjustable interlocking means, which are adapted to co-operate in alternately locking the two portions together and in subsequently releasing them.

Still another object is to provide a carrier having integral means for engaging and so securing the bottle therein as to prevent any movement or rattle thereof within the carrier.

While designed primarily for transporting milk bottles the carrier is equally well adapted to carry safely other bottles.

In order that the nature of my invention may be fully understood, I have illustrated certain embodiments of the invention in the accompanying drawing, in which:

Figure 1 is a vertical elevation of a milk bottle carrier showing in dotted outline a milk bottle inserted therein and embodying a preferred form of my invention.

Figure 2 is a cross-section on the line 2—2 of Figure 1.

Figure 3 is an enlarged fragmentary cross-section on the line 3—3 of Figure 1.

Figure 4 is an enlarged fragmentary section of that part of the locking means carried by the closure member.

In the drawing 1 designates a carrier having a tubular main body portion 2 provided with a wall inclined inwardly and constricted at its upper portion 3, being adapted at that point to engage and hold securely in a fixed position a milk bottle MB encased therein. Extending upwardly from the constricted portion 3 is a conical portion 4 engaging the rim 5 of the milk bottle and provided at its upper end with an annular rim 6, which furnishes means for grasping the carrier and enabling it to be readily carried. Inserted in the bottom of the main body portion 2 is a circular closure member 7 provided with a base plate 8 from which extends upwardly a circular rim 9 adapted to engage and interfit with the inner surface of the wall of the body portion 2. Mounted within the closure member 7 is a transversely disposed cross-bar 10, which is attached to the rim 9 of the closure member 7 and serves as a handle by grasping which the operator may readily attach or detach the closure member 7.

In the rim 9 of the closure member 7 are opposed cut-out portions 11 comprising an inclined edge 12 joining at its lower end a horizontal edge 13, raised above which is an elevated horizontal portion 14 provided with a depending locking lug 15. Located in the base of the body portion 2 are two opposed rectangular openings 16 formed with an upturned locking lug 17, each being adapted in its operative position to slide into firmly gripping engagement with its co-operating, depending, locking lug 15 in fixedly locking the parts together against lateral or vertical displacement, as well as securely fastening the closure member 7 and the body portion 2 of the carrier in their locked position.

Adjacent to each rectangular opening 16 is a vertically disposed L-shaped guide-way 18 outwardly pressed in the base of the wall of the body-portion 2, in which each locking lug 15 is adapted to be guided upwardly when the closure member 7 is being inserted in the carrier (Fig. 1). The L portion 19 of the guide-way serves to receive the depending locking ear 15 as it is turned to its engagement with the co-operating upturned locking lug 17 when it slides circumferentially into firm gripping contact therewith (Fig. 3) in locking the respective locking lugs and consequently the closure member 7 securely in a fixed position, whereby displacement of the closure member is effectively prevented. Therefore, a milk bottle thus protected and locked in the carrier may be safely transported without danger of contamination from handling or otherwise and delivered in a perfectly sanitary condition to a customer.

When it is desired to remove the milk bottle from the carrier, the closure member 7 is grasped by the cross-bar 10 and turned circumferentially, thereby causing the depending locking lug 15 to slide out of its engagement with the upturned locking lug 17 and thus freed to pass under control of the operator along the L portion 19 and hence down through the guide-way 18 until it is entirely freed from the carrier, when the milk bottle may be readily removed.

While the preferred embodiment of the invention herein shown and described is well adapted to fulfill the objects of the invention, it is to be understood that it is not intended to confine the invention to the precise form of construction herein disclosed, for it is susceptible of modification in various forms, all coming within the scope of the invention.

I claim:

1. A milk bottle carrier comprising a main cylindrical body portion having a lower open end, a cylindrical closure member adapted to be inserted in the said lower end of the main body portion, and co-operating locking means comprising upright and depending members carried respectively by the main body portion on its inner wall and spaced therefrom and the closure member similarly spaced from its inner wall and adapted to be circumferentially turned into longitudinal gripping engagement with each other in locking together the flanges and consequently the body portion and the closure member.

2. A milk bottle carrier comprising a main cylindrical body portion having a lower open end, a cylindrical closure member adapted to be inserted in the said lower end of the main body portion, and co-operating flanged locking means comprising upright and depending members carried respectively by the main body portion and the closure member and spaced therefrom, and pressed out of the wall and rim of the main body portion and closure member respectively, the edge of the rim of the closure member being provided with a cut-out portion carrying the depending locking means of the closure member.

3. A milk bottle carrier comprising a main cylindrical body-portion having a lower open end, a detachable closure member inserted in the main body portion, upstanding opposed locking lugs on the inner wall of the main body portion, depending opposed locking lugs on the outer wall of the closure member adapted to be turned into longitudinal gripping engagement with each other in locking together the said lugs and therefore the body portion and the closure member, and operative means for causing the locking and unlocking of the said co-operating locking lugs comprising a manually operated transversely disposed cross-bar attached to the rim of the closure member by means of which the said closure member is circumferentially turned when attached and detached by the operator.

4. A milk bottle carrier comprising a main cylindrical body-portion having a lower open end, a cylindrical closure member adapted to be inserted in the said lower end of the main body portion, and co-operating locking means carried by the main body portion and the closure member comprising a plurality of circumferentially disposed upstanding locking members on the inside of the main body portion, and depending complemental circumferentially disposed locking members on the outside of the closure member adapted to longitudinally slide into engagement with and firmly grip the said locking members in locking the parts together, and to be turned circumferentially in attaching and detaching the closure member.

5. A milk bottle carrier comprising a main cylindrical body portion having a lower open end, a cylindrical closure member adapted to be inserted in the said lower end of the main body portion, and co-operating locking means carried by the main body portion and the closure member comprising in the main body portion a plurality of opposed rectangular openings each formed with an upturned locking lug extending upwardly from its upper edge, and in the rim of the closure member a plurality of opposed cut-out portions comprising an inclined edge joining at its lower end a horizontal edge, above which is an elevated horizontal portion provided with a depending locking lug adapted to engage and grip the upturned lug of the body portion in locking the parts together.

6. A milk bottle carrier comprising a main cylindrical body portion having a lower open end, a cylindrical closure member adapted to be inserted in the said lower end of the main body portion, co-operating locking means carried by the main body portion and the closure member comprising a plurality of upright circumferentially disposed locking lugs on the inside of the main body portion and depending complemental circumferentially disposed locking lugs on the outside of the closure member adapted to longitudinally slide into engagement with and firmly grip the said locking lugs in locking the parts together and to be disengaged by turning the closure member circumferentially, and a plurality of guide-ways formed in the wall of the main body portion for guiding the locking lugs of the said closure member.

7. A milk bottle carrier ocmprising a main cylindrical body portion having a lower open end, a cylindrical closure member adapted to be inserted in the said lower end of the main body portion, co-operating locking means carried by the main body portion and the closure member comprising a plurality of circumferentially disposed upstanding locking lugs on the inside of the main body portion and complemental depending circumferentially disposed locking lugs on the outside of the closure member adapted to interfit with the said locking lugs in locking the parts together and to be disengaged by turning the closure member circumferentially and a plurality of vertically disposed L-shaped guideways outwardly pressed in the wall of the body portion adapted to guide upwardly the locking lugs of the closure member, and provided with an L portion cooperating with each locking lug as it is turned to engage or disengage the complemental locking lug of the body portion.

ERNEST E. DONAGHY.